United States Patent [19]

Jones

[11] Patent Number: 4,846,688

[45] Date of Patent: Jul. 11, 1989

[54] EDUCATIONAL DEVICE FOR USE IN TEACHING WRITING SKILLS

[76] Inventor: Charles R. Jones, Rte. 2, Box 99, Walnut, Miss. 38683

[21] Appl. No.: 225,050

[22] Filed: Jul. 27, 1988

Related U.S. Application Data

[63] Continuation-in-part of Ser. No. 125,873, Nov. 27, 1987, abandoned.

[51] Int. Cl.⁴ ............................................. G09B 11/04
[52] U.S. Cl. ................................................... 434/164
[58] Field of Search .................. 434/164, 165, 166; 33/23.01, 23.02, 23.08, 23.11, 25.1, 25.2, 25.4, 25.5, 41.2

[56] References Cited

U.S. PATENT DOCUMENTS

| | | | |
|---|---|---|---|
| 1,143,393 | 6/1915 | Higbee | 434/164 |
| 1,887,161 | 11/1932 | Lorber | 434/164 |
| 3,382,592 | 5/1968 | Lucero | 434/164 |
| 3,673,708 | 7/1972 | Bevens | 434/164 |
| 3,731,402 | 5/1973 | Paul | 434/164 |

FOREIGN PATENT DOCUMENTS

| | | | |
|---|---|---|---|
| 101845 | 8/1937 | Australia | 434/164 |
| 294060 | 9/1916 | Fed. Rep. of Germany | 434/164 |
| 2516803 | 5/1983 | France | 434/164 |

*Primary Examiner*—William H. Grieb
*Attorney, Agent, or Firm*—Walker & McKenzie

[57] ABSTRACT

An educational device for use in teaching writing skills to students. The device includes, in combination, a board member having a plurality of grooves therein, each of the grooves forming at least a portion of a specific character; and a tracing stylus having a staff for being held by a student and having a tracer element coupled to the staff and for extending into at least one of the grooves to follow at least one of the grooves and to guide the movement of the staff when moved properly by the student, and having a contact plate for engaging the board member when the tracer element extends into one of the grooves.

16 Claims, 4 Drawing Sheets

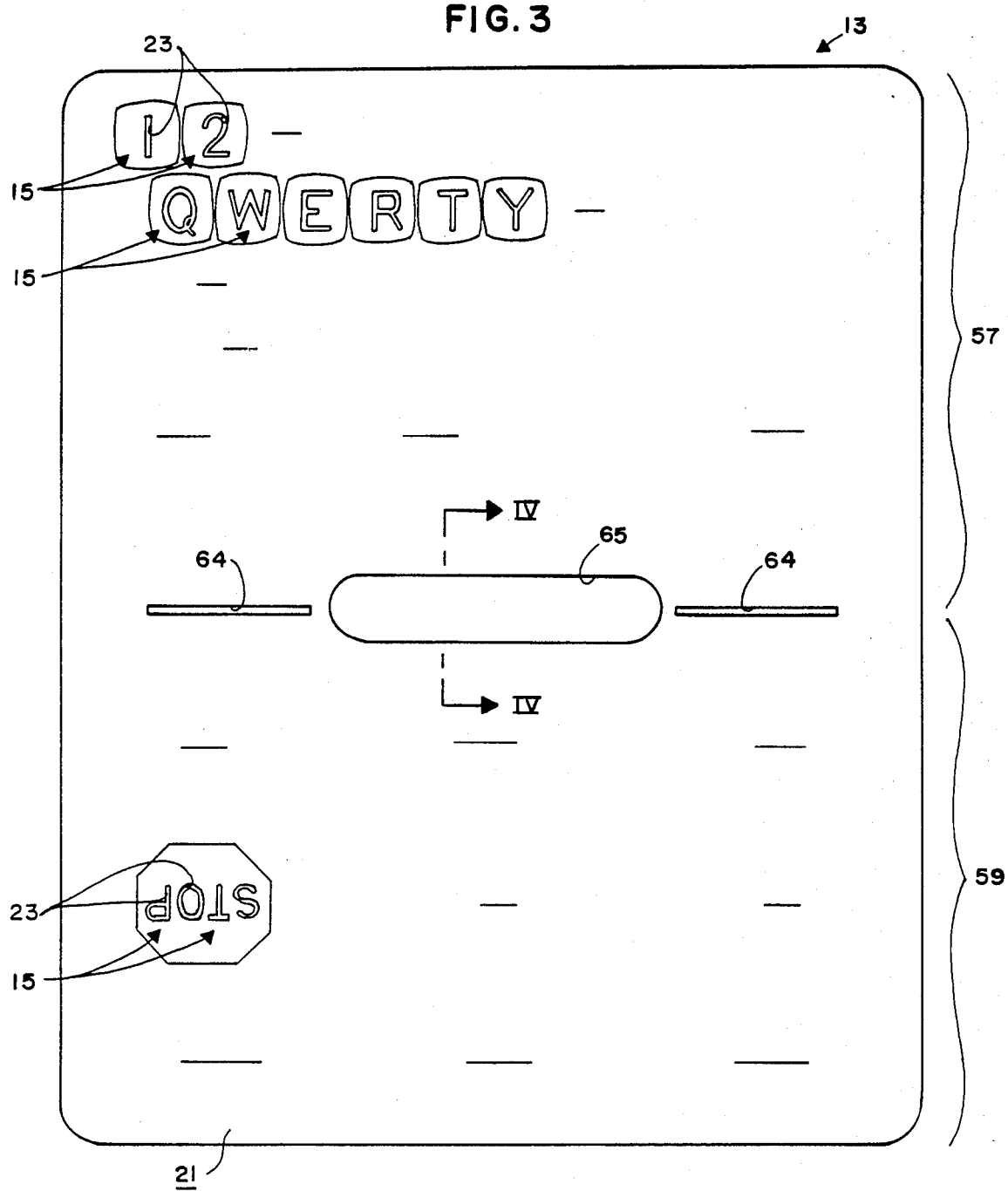
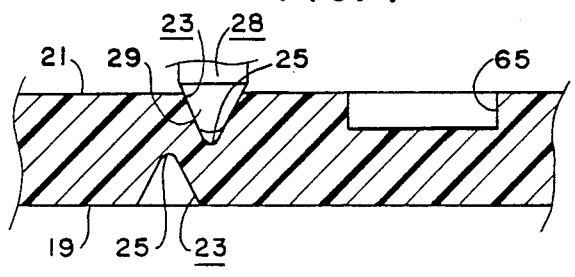
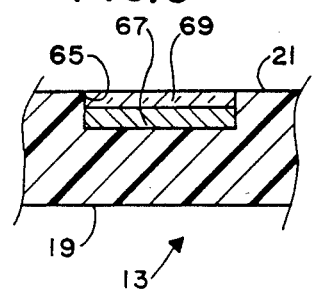

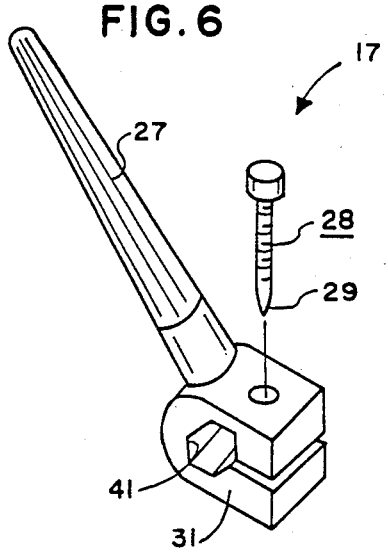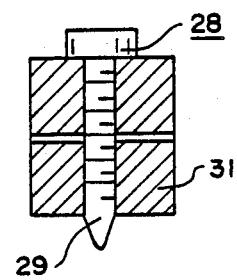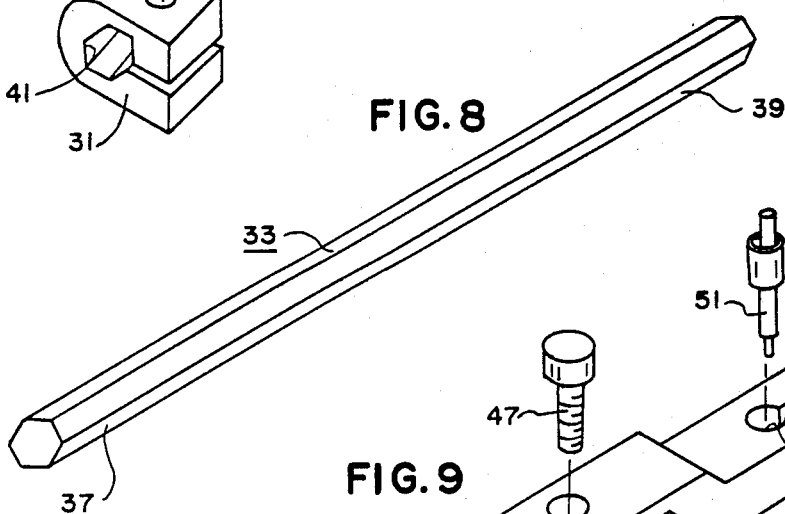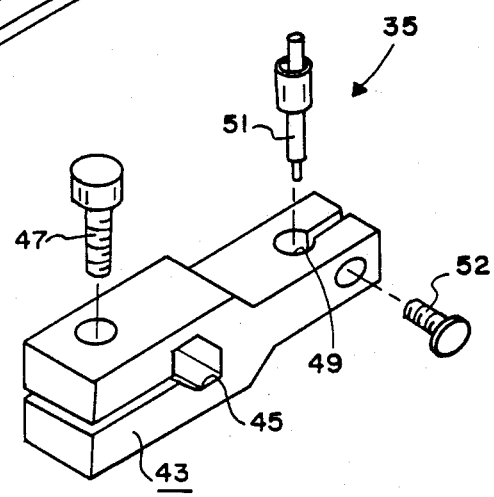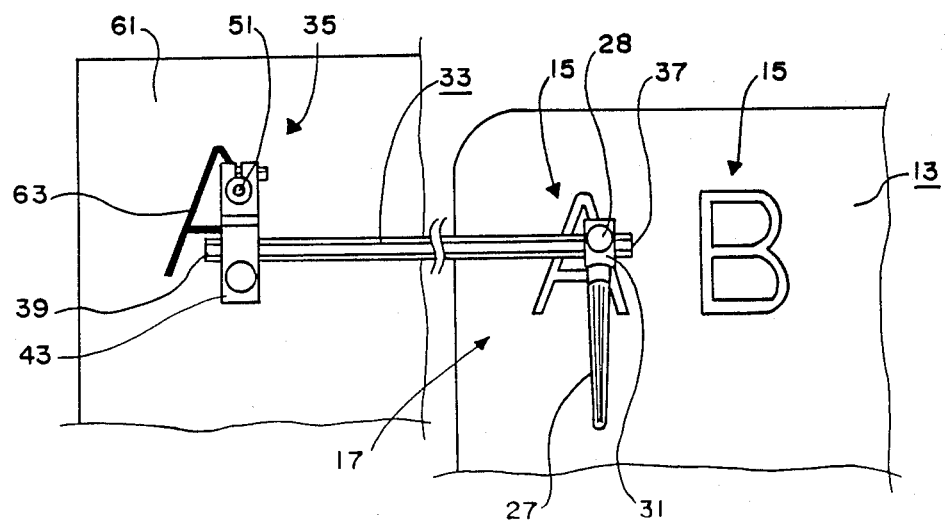

EDUCATIONAL DEVICE FOR USE IN TEACHING WRITING SKILLS

CROSS-REFERENCE TO RELATED APPLICATION

This is a continuation-in-part of my application, Ser. No. 07/125,873, filed Nov. 27, 1987 entitled "Educational Device now abandoned."

BACKGROUND OF THE INVENTION

1. Field of the Invention:

The present invention relates, in general, to an educational device for use in teaching writing skills and, more specifically, the use of pencil, pen, and/or brush in free-hand forming phonetic, numerical or pictorial letters and characters.

2. Description of the Related Art:

Various patents have heretofore issued on improved writing aids and the like. See, for example, Higbee, U.S. Pat. No. 1,143,393; Lorber, U.S. Pat. No. 1,887,161; Lucero, U.S. Pat. No. 3,382,592; Paul, U.S. Pat. No. 3,731,402; Chandler, Australian Pat. No. 101,845; and Weiss, French Pat. No. 2,516,893. None of the above patents disclose or sugeest the present invention.

Grooved or through-cut lettering guides have long been available and currently are marketed under various brand names such as "Leroy", "Tech-Graphic", "Wrico", etc. Such lettering guides are 100% mechanically guided, and thus are not designed to be used in the primary teaching of letter forms and names and are not suited for teaching young children. More specifically, the chief use for such lettering guides is for the preparation of maps, presentation drawings in the mechanical and construction trades, and for lettering drawings which will be reprinted thousands of times, such as the wiring diagrams found on major household appliances.

The familiar ABC blocks are usually the first letter-teaching devices given to a child. However, such blocks do not teach anything about copying the letters and the child typically loses interest in the blocks before becoming interested in lettering.

Educational television is currently achieving excellent success in the teaching of both the shapes and the sounds of letters. However, such educational television reaches only a fortunate segment of the world's population, is entirely visual in nature and thus does not provide manual or hand training. Further, the student can respond only while a particular exercise is being shown and the student may have to compete with other family members for viewing time, etc.

The most popular means of pre-school child education requires that the teacher, usually a parent, properly place a pencil into the child's grasp, then place the teacher's hand over that of the child, and guide the child's hand while an attempt is made to produce an acceptable letter.

Though in use since alphabets were first invented, the method, a one-on-one operation, remains very slow and inefficient. Also, the modern trend is for both parents to accept employment outside the home, thus drastically reducing the time available for child pre-education. Further, parents are leaving their children with child-care enterprises which of course want as many children as their operation permits, thus resulting in groups where the one-on-one teaching method is inapplicable.

Hence the invention hereinafter disclosed.

SUMMARY OF THE INVENTION

The present invention is directed toward providing a device for teaching basic writing skills and, more specifically, the ability to form characters, such as alphabetic letters, pictorial characters and the like with a pen, pencil or brush.

The educational device of the present invention is for use in teaching manual cursive writing and hand-printing skills to students. The device includes, in combination, a board member having a plurality of grooves therein, each of the grooves forming at least a portion of a specific character; and a tracing stylus having a staff for being held by a student, having a tracer element coupled to the staff and for extending into at least one of the grooves to follow at least one of the grooves and the guide the movement of the staff when moved properly by the student, and having a contact plate for engaging the board member when the tracer element extends into one of the grooves.

Advantages of the device of the present invention over the usual present method and devices include:

1. Exact repeated definition of any selected character when properly traced.
2. Manual guiding of the pupil's hand will become unnecessary as soon as the pupil learns to follow the grooves with the contact plate engaging the board member to hold the stylus square with the board member.
3. More students can be supervised by one teacher.
4. One pupil can help another.
5. A pupil can use the device as a form of amusement.
6. Pupils will develop greater uniformity in freehand work.
7. Older students can use the device with even greater facility.
8. One device can be used by an entire family or village.
9. The device can be used by either right or left handed students.
10. The device is inherently rugged and will require only minimal care for long usage.
11. The device is relatively inexpensive.
12. The device device requires no battery or other electrical source.
13. The device can be used to teach office machine keyboard layout.
14. The device enables blind students to learn quickly to make standard characters.
15. The device is excellent for immigrants from a pictorial culture to a phonetic culture.

BRIEF DESCRIPTION OF THE DRAWINGS

FIG. 3 is a plan view of the second side of the board member of the educational device of the present invention.

FIG. 4 is an enlarged sectional view substantially as taken on line IV—IV of FIG. 3.

FIG. 5 is a sectional view similar to FIG. 4 but showing an auxiliary board member coupled to the board member of the present invention.

FIG. 6 is an exploded pictorial view of the staff, tracer element and body of the tracing stylus of the educational device of the present invention.

FIG. 7 is a sectional view of the body of the tracing stylus of the educational device of the present invention showing the tracing element thereof.

FIG. 8 is a pictorial view of the outrigger beam of the tracing stylus of the educational device of the present invention.

FIG. 9 is an exploede pictorial view of the marking means of the tracing stylus of the educational device of the present invention.

FIG. 10 is a somewhat diagrammatic plan view of a portion of the educational device of the present invention in use.

DESCRIPTION OF THE PREFERRED EMBODIMENTS

Figure 1:
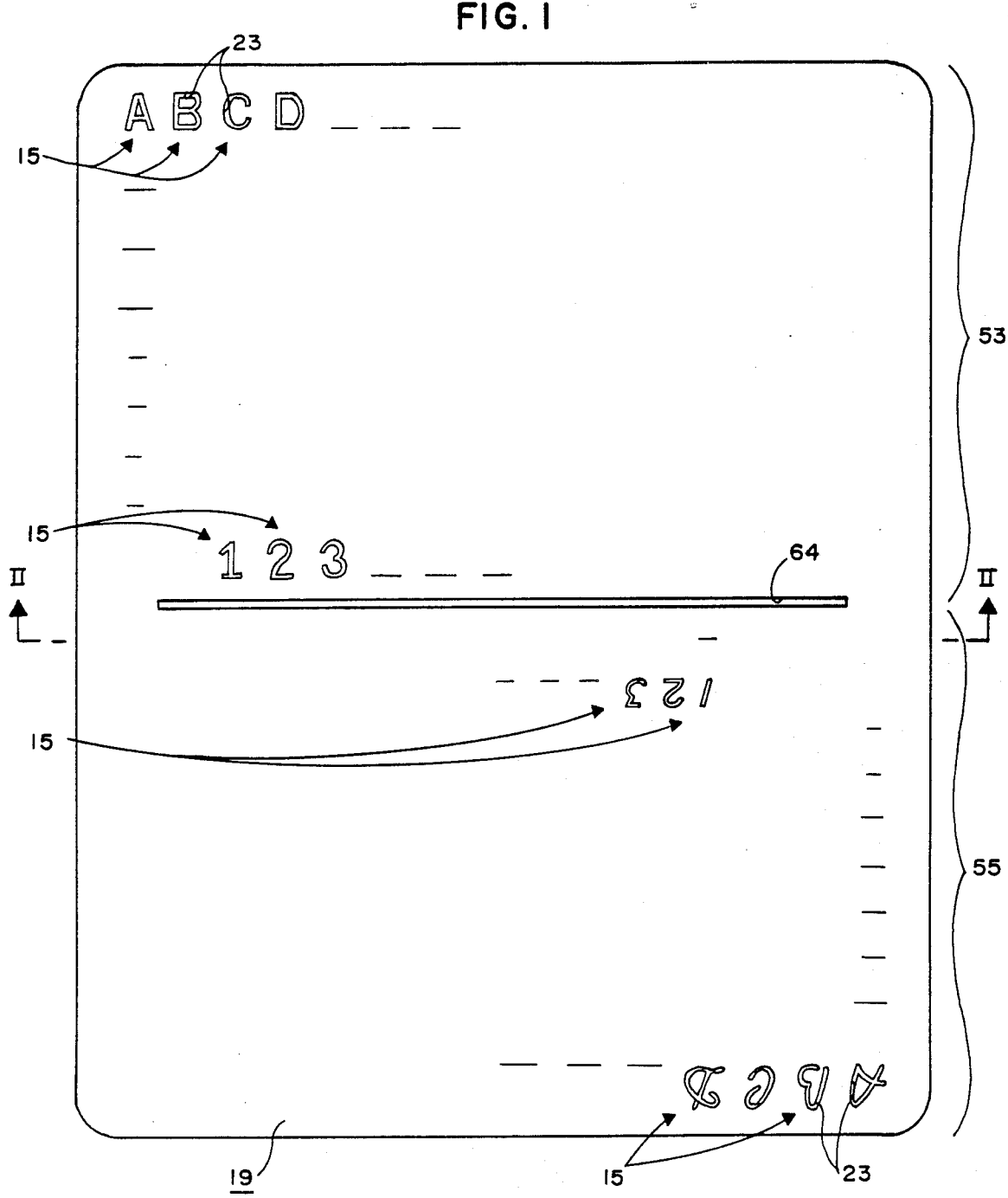
FIG. 1 is a plan view of the first side of the board member of the educational device of the present invention.
Figure 2:
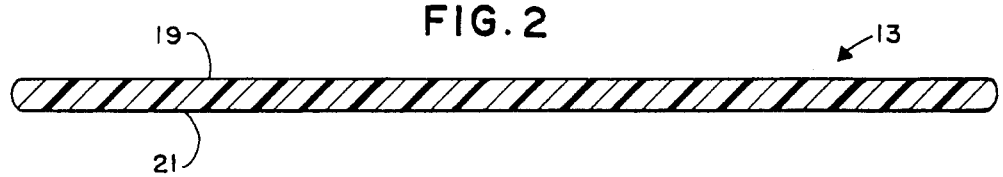
FIG. 2 is a sectional view substantially as taken on line II—II of FIG. 1.

A preferred embodiment of the educational device 11 of the present invention is shown in FIGS. 1-10. The device 11 is used in teaching basic writing skills and the like. The device 11 includes, in combination, a board member 13 having a plurality of characters 15 thereon, and a tracing stylus 17 for use in tracing one or more of the characters 15.

The board member 13 is preferably formed as a substnially flat, rectangular plate having a substantially flat first side 19 and a substantially flat second side 21. The characters 15 are preferably provided on both the first and second sides 19, 21 of the board member 13. The characters 15 are preferably formed by grooves 23 molded, cut or otherwise formed into the first and second sides 19, 21 of the board member 13 in the shape of the various specific characters. The grooves 23 may form alphabetical, numerical, and/or pictorial characters in any language or languages and in any genre, alone or in any combination, and in any style or styles. An important feature of the present invention as shown in FIG. 3 is that the grooves 23 may form an office machine format, e.g., the typical "qwerty" typewriter, computer keyboard layout, to allow a student to become familar with such office machine formats at an early age, etc. Each groove 23 is shown as substantially V-shaped in cross section with a rounded bottom 25 to avoid sharp stress-raising corners and to minimize the total thickness of the board member 13. The board member 13 may be made of any desired material having good workability, non-toxicity, color, and cost acceptability such as, for example, one or a combination of the various thermoplastic resins available from du Pont and several others. The characters 15 may be molded, pressed, engraved or cut into the board member 13. The color of the board member may be selected for good visibility and appeal. The outer edges of the board member 13, the walls and the bottom of the grooves 23 may be painted or otherwise colored to contrast with the sides 19, 21, etc.

The tracing stylus 17 preferably includes an elongated staff or handle 27 for being held by the student, a tracer element 28 having a tracer point 29 for extending into the grooves 23 of the characters 15, and a body 31 attached to one end of the handle 27 for securing the tracer element 28 to the handle 27. The tracer point 29 is preferably conical and preferably has a rounded end, the radius of which is preferably slightly greater than that of the rounded bottom 25 to allow the sloping sides of the tracer point 29 to slidably engage the sloping sides of the grooves 23 while preventing the end of the tracer point 29 from contacting the rounded bottom 25 of the grooves 23. Due to such construction, downward pressure on the tracer element 28 causes the tracer point 29 to contact the sides or V-slopes of the grooves 23, which in turn causes the tracer element 28 to assume the desired upright attitude in the user's grasp. Also, the same construction provides a considerable wear factor before the tracer radius finally begins to bottom out in the grooves 23, thus extending the useful life of the board member 13 (if the tracer point 29 bottoms out, further groove wear would cause the stylus 17 to become wobbly in the user's hand, thereby becoming a distraction). The included angle of the conical tracer point 29 is preferably approximately that of the grooves 23. The tracing stylus 17 preferably includes an elongated outrigger beam 33 for being secured to the body 31 and a marking means 35 for being secured to the outrigger beam 33 for allowing the student to write or draw the characters 15 on a piece of paper, or the like, as the characters 15 are traced with the tracer point 29. More specifically, the outrigger beam 33 preferably has a first end 37 for being secured in an adjustable manner to the body 31 and a second end 39 for being secured to the marking means 35. The body 31 preferably has an aperture 41 therethrough for slidably receiving the first end 37 of the outrigger beam 33. The marking means 35 preferably includes a body 43 having an aperture 45 therethrough for slidably receiving the second end 39 of the outrigger beam 33. The apertures 41, 45 and the outrigger beam 33 preferably have corresponding polygonal cross-sectional shapes to prevent rotation of the outrigger beam 33 within the apertures 41, 45. A screw 47 may be provided to securely clamp the outrigger beam 33 to the body 43 as will now be apparent to those skilled in the art. Another screw may be provided to securely clamp the outrigger beam 33 to the body 31 as will now be apparent to those skilled in the art (the tracer element 28 may, in fact, form the screw to secure the first end 37 of the beam 33 to the body 31 as clearly shown in the drawings). The body 43 of the marking means 35 preferably includes an aperture 49 for allowing a marking element 51 to be removably secured thereto. The marking element 51 forms an integral part of the marking means 35 and may consist of a typical commercially available technical pen or pencil such as certain models of the Koh-I-Noor technical pens produced by Rapidograph Inc. of Bloomsbury, N.J.. A screw 52 may be provided to secure the marking element 51 within the aperture 49 as will now be apparent to those skilled in the art. The various screws amy be the allen-head or similar type to prevent dismantling of the tracing sytlus 17 with more common tools.

The first side 19 of the board member 13 may be divided generally into a first half 53 and a second half 55 with the first half 53 preferably including characters 15 forming the entire lower and upper case alphabet and Arabic numbers in various sized and with each character 15 arranged substantially vertically and with the second half 55 preferably including characters 15 forming the entire lower and lower case alphabet and Arabic numbers, etc., in various sizes and with each character 15 arranged slanted (see FIG. 1). The second side 21 of the board member 13 may also be divided generally into a first half 57 and a second half 59 with the characters 15 on the first half 57 forming the typical keyboard layout of typical office machines (typewriter, computer, adding machine), telephones, clock faces, etc. and with the characters 15 on the second half 59 forming typical road signs, etc. The characters 15 on the first and second halves of each side 19, 21 are preferably rotated 180 degrees relative to one another so that the uppermost half will be oriented in the "upright" position and the tracing stylus 17, when in use, will always be associated with the upper half of the board member 13 in order for the student's hand and at least a portion of the forearm to always rest on a lower portion of the board member 13 when tracing one of the characters 15 to prevent the board member 13 from moving when the student exerts sidewise pressure on the board member 13 with the tracing stylus 17, etc.

Wherever applicable, a printer's division line 64 may be indented into the sides 19, 21 of the board member 13 between the first and second halves thereof to give visual as well as tactile (for blind pupils) indication of the limits of the different character areas of the board member 13.

The board member 13 may have one or more depressions or channels 65 in one or both sides 19, 21 thereof, and the device 11 may include one or more auxiliary board members 67 for being attached to the board member 13 by being snapped into, glued to or otherwise secured to a channel 65. Each auxilary board member 67 may have indicia thereon for identifying the ownership and/or type of the specific board member 13, etc. Thus, while for very large orders, such as state or federal agencies, the owners insignia could most economically be built directly into the mold, the above construction provides every retail customer an easy way to add identification to the board member 13. A clear plate 69 may be provided for being snapped into a channel 65 over an auxiliary board member 67 to protect the board member 67, etc, (see FIG. 5). The channel 65 may be located adjacent the division line 64 as clearly shown in FIG. 3.

Figure 11:
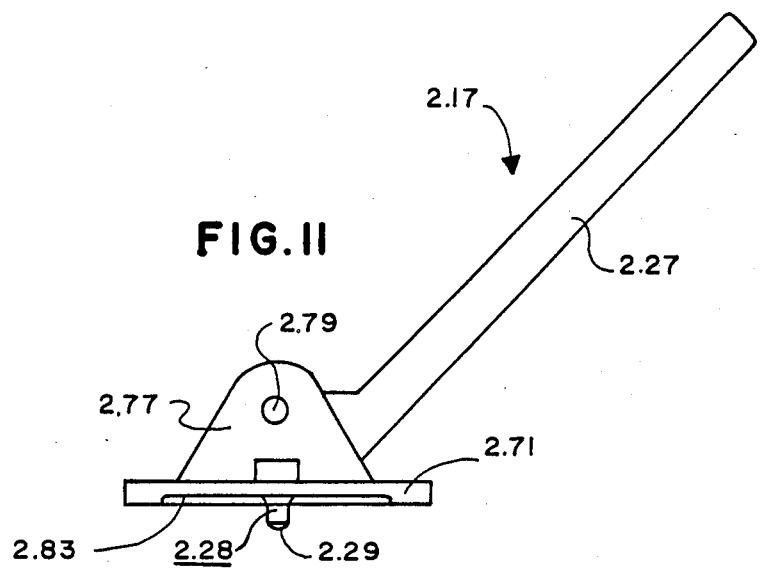
FIG. 11 is a side elevation view of a modified embodiment of the tracing stylus of the educational device of the present invention.
Figure 12:
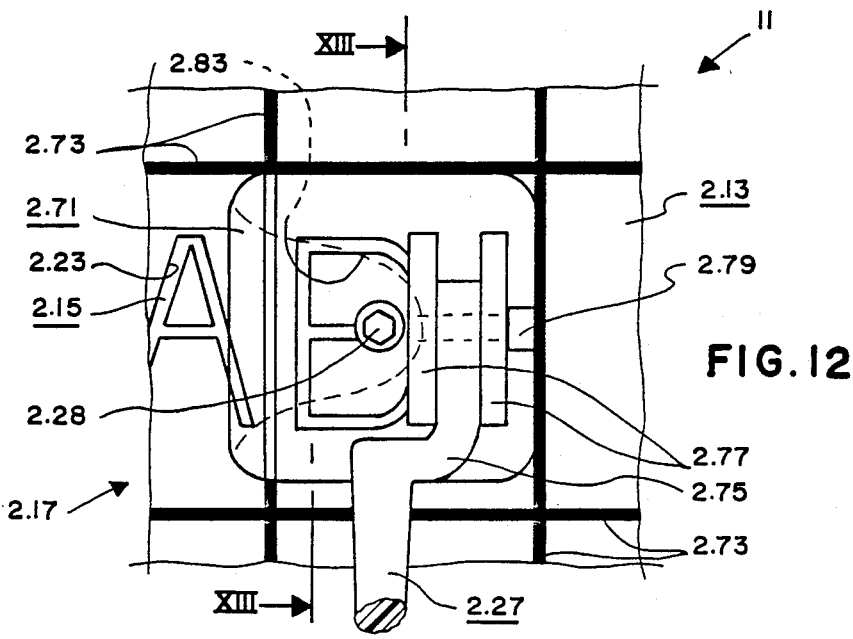
FIG. 12 is a somewhat diagrammatic plan view of the tracing stylus of FIG. 11 shown associated with a modified embodiment of the board member of the educational device of the present invention.
Figure 13:
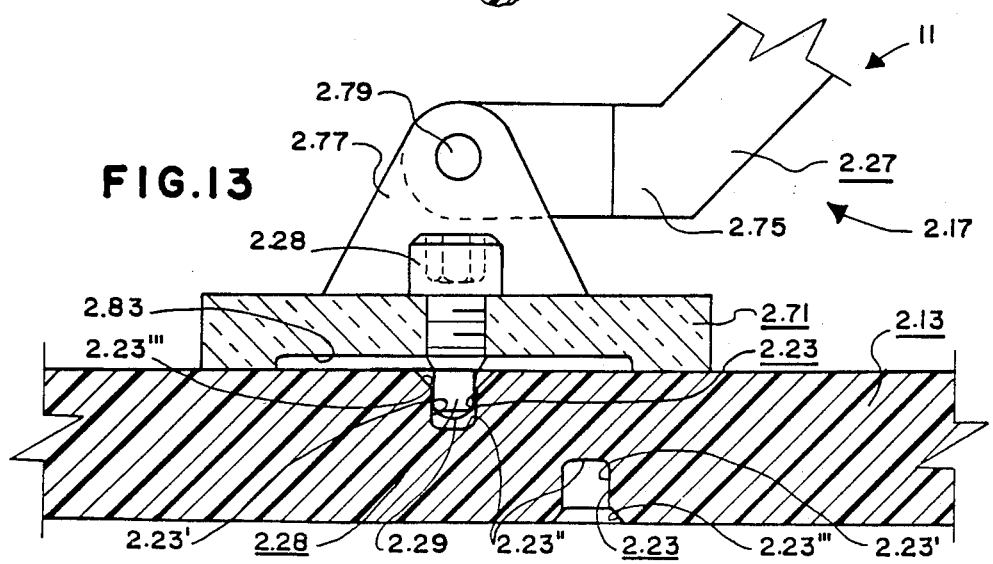
FIG. 13 is an enlarged sectional view substantially as taken on line XIII—XIII of FIG. 12.

A modified embodiment of the tracing stylus of the device 11 is shown in FIGS. 11–13 and is identified by the numeral 2.17. The tracing stylus 2.17 is similar to the tracing stylus 17 and includes a staff 2.27 for being held by a student and a tracer element 2.28 coupled to the staff 2.27 and having a tracer point 2.29. The tracer point 2.29 is preferably substantially cylindrical with a rounded end or point for safety. A modified embodiment of the board member of the device 11 is shown in FIGS. 12 and 13 and is identified by the numeral 2.13. The board member 2.13 is similar to the board member 13 and has a plurality of characters 2.15 thereon formed by grooves 2.23 molded or cut or otherwise formed into the face surfaces of the board member 2.13. The grooves 2.23 preferably have substantially straight sides 2.23' and a substantially flat bottom 2.23" for receiving the substantially cylindrical tracer point 2.29 as clearly shown in FIG. 13. The outer edge of each groove 2.23 have small chamfers 2.23''' to facilitate entry of the tracer point 2.29 and to give a heavier, more visible character outline. More specifically, each groove 2.23 is preferably substantially funnel-shaped in cross section with a flat or slightly convex bottom 2.23" and preferably a small fillet where the bottom 2.23" joins the sides 2.23'. The sides 2.23' are preferably substantially parallel with only enough draft to insure satifactory withdrawal from the forming tooling during manufacture. The small chamfers 2.23''' complete the funnel shape of the grooves 2.23. A unique feature of the tracing stylus 2.17 is the addition of a contact plate 2.71 for engaging the surface of the board member 2.13 when the tracer point 2.29 is in a groove 2.23 to keep the stylus 2.17 square with the board member 13; to prevent twisting of the staff 2.27 which can damage the grooves 2.23; to limit penetration of the tracer point 2.29 into the grooves 2.23 with consequent wear; and to allow the stylus 2.17 to move smoothly and easily while characters 2.15 are being traced, etc. The board member 2.13 may be provided with parallel grid lines 2.73 between the characters 2.15 for use in properly aligning and maintaining alignment of the tracing stylus 2.17 relative to the characters 2.15. More specifically, the contact plate 2.71 is preferably substantially square whereby the student can visually align the straight edges thereof with the grid lines 2.73 to thus keep the stylus 2.17 square with the board member 2.13 which will aid the student in acquiring the habit of making vertical freehand work. The staff 2.27 preferably has an offset portion 2.75 to provide open visibilty at the tracer element 2.28. The stylus 2.17 is preferably provided with a staff 2.27 with an offset portion 2.75 as shown in FIG. 12 for use by right hand students and a staff 2.27 with an offset portion 2.75 extending opposite from that shown in FIG. 12 for use by left hand students as will now be apparent to those skilled in the art. The staff 2.27 is preferably pivotally coupled to the tracer element 2.28 and contact plate 2.71 to allow the angle thereof to be adjusted to suit the student. Thus, the stylus 2.17 may include a pair of spaced lugs 2.77 attached to and extending upwardly from the upper surface of the contact plate 2.17 and the staff 2.27 may be attaached thereto by a screw 2.79. Each lug 2.77 preferably has an aperture for receiving the screw 2.79 and the aperture opposite the head of the screw 2.79 is preferably threaded as will now be apparent to those skilled in the art. The tracer element 2.28 may consist of a screw for extending through a thread aperture 2.81 in the contact plate 2.71 with the distal end thereof machined or otherwise modified to form the tracer point 2.29. The contact plate 2.71 is preferably constructed of a plat, transparent material such as plastic or the like with the corners thereof rounded for safety. The contact plate 2.71 preferably haas a relieved portion 2.83 in the area which a student will look as he seeks to insert the tracer point 2.29 nto the groove 2.23 of the selected character 2.15. The relieved portion will prevent the face surface of the plate 2.71 from becoming scratched and dull due to environmental dust and the like and which might hinder vision therethrough. The relieved portion 2.83 will allow unobscured vision even after the contact plate 2.71 becomes worn over its contact area. The tracing stylus 2.17 may be adapted to receive to iutrigger beam 33 and marking means 35 in any manner now apparent to those skilled in the art. Thus, for example, the contact plate 2.71 may be provided with a boss member or the like (not shown) having a polygonal shaped aperture therethrough for receiving the outrigger beam as will nowe be apparent to those skilled in the art. The funnel shape of the grooves 2.23 provides four significant advantages in the design of the board member 2.13 and the tooling for its manufacture: (1) The chamfers 2.23''' and width across the grooves 2.23 for greater visibility through the contact plate 2.71 of the stylus 2.17; (2) The chamfers 2.23''' add width across the grooves 2.23 which makes for easier entry of the tracer point 2.29; (3) The chamfers 2.23''' reduce the danger of mutilating the grooves 2.23 if the user elects to use an unsuitable point for tracing, such as that of a ball-point pen; (4) The chambers 2.23''' are preferably formed by corresponding angular fillets on the tooling, where they add resistance to fin breakage during handling and manufacture of both the board 2.13 and the tooling.

The use and operation of the present invention is quite simple. For the first time user, all the teacher has to do is to see that the pupil holds the tracing stylus 17 (without the outrigger beam 33 and marking means 35) in the correct attitude with the tracer point 29, 2.29 within the proper or selected groove 23, 2.23 and to see that the pupil traces the character 15, 2.15 in the proper rotational direction, etc., with the contact plate 2.71 engaging the surface of the board member 13, 2.13. After satisfactory pupil progress, the teacher may attach the outrigger beam 33 and making means 35 to the body 31 of the tracing stylus 17 or to the contact plate 2.71, etc., and the paper 61 may be placed next to the board member 13. With the marking means 35 properly adjusted, a traced character 63 will be formed on the paper 61 when the character 15, 2.15 is traced as will now be apparent to those skilled in the art. The pupil will learn to first get the tracer point 29, 2.29 in the proper groove 23, 2.23, then to lower the marking means 35 into contact with the paper 61, to hold the tracing stylus 17, 2.17 in a vertical plane parallel to the longer sides of the board member 13, 2.13, and to use the entire arm when guiding the stylus 17, 2.17 instead of flexing the fingers, thus learning basic requirements of good penmanship, etc. A rubber or rubber-like plastic board or pad (not shown) having a substantially smooth top surface and having a plurality of downwardly extending flexible papillae on its bottom surface may be provided for resting on top of the board member 13, 2.13 or desk top or both, and for supporting the student's arm as the device 11 is used. The pad may be about 6 inches wide by 15 inches long and will move in any horizontal direction in response to the student's arm movement by flexing of the papillae. The present invention thus provides an intermediate step between 100% mechanically guided lettering using prior lettering guides and 100% free-hand lettering.

Although the present invention has been described and illustrated with respect to a preferred embodiment and a preferred use therefor, it is not to be so limited since modifications and changes can be therein which are within the full intended scope of the invention.

I claim:

1. An educational device for use in teaching writing skills to a student, said device comprising, in combination:
   (a) a board member having a substantially flat first side and a second side, said board member having a plurality of grooves in said substantially flat first side thereof for forming a plurality of characters, each of said grooves forming at least a portion of a specific character, said substantially flat first side having a first half and a second half with each of said halves having a plurality of characters, said characters on said first half being rotated 180 degrees relative to said characters on said second half, said characters on said first and second halves being arranged so that said board member can be positioned with said characters on an upper one of said halves oriented in an "upright" position allow the student's hand and at least a portion of the forearm to rest on portion of a lower one of said halves when tracing one of said characters from said upper one of said halves to prevent said board member from moving when the student exerts sidewise pressure on said board member; and
   (b) a tracing stylus including a staff for being held by a student, including a tracer element coupled to said staff and for extending into at leaast one of said grooves to follow at least one of said grooves and to guide the movement of said staff when moved properly by the student, and including a contact plate for engaging said board member when said tracer element extends into one of said grooves.

2. The educational device of claim 1 in which each of said grooves is substaantially V-shaped in cross section.

3. The educational device of claim 2 in which each of said grooves has a rounded bottom.

4. The educational device of claim 1 in which said characters on a first part of said board member are arranged 180 degrees from said characters on a second part of said board member.

5. The educational device of claim 4 in which said first part of said board member forms a first half of said board member and in which said second part of said board member forms a second half of said board member.

6. The educational device of claim 3 in which said tracer element includes a conical tracer point for extending into said grooves with the included angle of said conical point being approximately the same as the included cross-sectional angle of said grooves.

7. The educational device of claim 6 in which said tracer point has a rounded point, the radius of which is slightly greater than said rounded bottom of said grooves.

8. The educational device of claim 1 in which said characters include alphabetical, numerical and pictorial representations.

9. An educational device for use in teaching writing skills to a student, said device comprising, in combination:
   (a) a board member having a plurlity of grooves therein, each of said grooves forming at least a portion of a specific character, said board member having a channel therein;
   (b) a traacing stylus including a staff for being held by a student, including a tracing element coupled to said staff and for extending into at least one of said grooves to follow at least one of said grooves and to guide the movement of said staff when moved properly by the student, and including a contact plate for engaging said board member when said tracer element extends into of said grooves; and
   (c) an auxiliary board having a plurality of auxiliary grooves therein, each of said auxiliary grooves forming at least a portion of an auxiliary character, said auxiliary board being removably attachable to said slot in said board member.

10. The educational device of claim 1 in which said characters form an office machine layout.

11. An educational device for use in teaching writing skills to a student, said device comprising, in combination:

(a) a board member having a plurality of grooves therein, each of said grooves forming at least a portion of a specific character; and
(b) a tracing stylus including a staff for being held by a student, including a tracer element coupled to said staff and for extending into at least one of said grooves to follow at least one of said grooves and to guide the movement of said staff when moved properly by the student, and including a contact plate for engaging said board member when said tracer element extends into one of said grooves; said tracer point being substantially cylindrical and having a rounded point for safety, said grooves having substantially straight sides and a substantially flat bottom for receiving said tracer point.

12. The educational device of claim 11 in which the outer edge of each grooves is flared slightly to facilitate entry of said tracer point and to give a heavier, more visible character outline.

13. The education device for use in teaching writing skills to a student, said device comprising, in combination:
(a) a board member having a plurality of grooves therein, each of said grooves forming at least a portion of a specific character; and
(b) a tracing stylus including a staff for being held by a student, including a tracer element coupled to said staff and for extending into at least one of said grooves to follow at least one of said grooves and to guide the movement of said staff when moved properly by the student, and including a contact plate for engaging said board member when said tracer element extends into one of said grooves; said contact plate being substantially square; said board member being provided with parallel grid lines between said characters for use in properly aligning and maintaining alignment of said tracing stylus relative to said characters.

14. The educational device of claim 1 in which said staff has an offset portion to provide open visibility at said tracer element.

15. An educational device for use in teaching writing skills to a student, said device comprising, in combination:
(a) a board member having a plurality of grooves therein, each of said grooves forming at least a portion of a specific character; and
(b) a tracing stylus including a staff for being held by a student, including a tracer element coupled to said staff and for entending into at least one of said grooves to follow at least one of said grooves and to guide the movement of said staff when moved properly by the student, and including a contact plate for engaging said board member when said tracer element extends into one of said grooves; said staff being pivotally coupled to said tracer element and contact plate to allow the angle thereof to be adjusted to suit the student.

16. An educational device for use in teaching writing skills to a student, said device comprising, in combination:
(a) a board member having a plurality of grooves therein, each of said grooves forming at least a portion of a specific character; and
(b) a tracing stylus including a staff for being held by a student, including a tracer element coupled to said staff and for extending into at least one of said grooves to follow at least one of said grooves and to guide the movement of said staff when properly by the student, and including a contact plate for engaging said board member when said tracer element extends into one of said grooves; said contact plate having a relieved portion in the area which a student will look as said tracer point is inserted into said groove of a selected one of said characters.

* * * * *